US008986477B2

(12) United States Patent
Hinc (10) Patent No.: US 8,986,477 B2
(45) Date of Patent: Mar. 24, 2015

(54) DEVICE AND METHOD FOR EMBEDDING THREADS IN A RUBBER PROFILED ELEMENT (75) Inventor: Henri Hinc, Romagnat (FR)

(73) Assignees: Michelin Recherche et Technique S.A., Granges-Paccot (CH); Compagnie Generale des Etablissments Michelin, Clermont-Ferrand (FR)

( * ) Notice: Subject to any disclaimer, the term of this patent is extended or adjusted under 35 U.S.C. 154(b) by 423 days.

(21) Appl. No.: 13/393,828

(22) PCT Filed: Sep. 2, 2010

(86) PCT No.: PCT/EP2010/062907
§ 371 (c)(1),
(2), (4) Date: Dec. 7, 2012

(87) PCT Pub. No.: WO2011/026916
PCT Pub. Date: Mar. 10, 2011

(65) Prior Publication Data
US 2013/0075015 A1 Mar. 28, 2013

(30) Foreign Application Priority Data
Sep. 3, 2009 (FR) .................................... 09 56009

(51) Int. Cl.
B29C 70/06 (2006.01)
B29C 70/88 (2006.01)
(Continued)

(52) U.S. Cl.
CPC ............... *B29C 70/06* (2013.01); *B29C 70/887* (2013.01); *B29D 30/38* (2013.01); *B29D 30/46* (2013.01); *B60C 11/14* (2013.01);
(Continued)

(58) Field of Classification Search
CPC ........ B29C 70/06; B29C 70/12; B29C 70/14; B29C 70/54; B29C 70/887; B29D 30/38; B29D 30/46; B29D 2030/38; B29D 2030/46; B29D 2030/463; B60C 11/00; B60C 11/14; B29L 2030/002
USPC ......................... 156/72, 92, 93, 250, 510, 538
See application file for complete search history.

(56) References Cited

U.S. PATENT DOCUMENTS 5,186,776 A 2/1993 Boyce et al.
5,429,853 A 7/1995 Darrieux
(Continued)

FOREIGN PATENT DOCUMENTS

EP 0 389 465 9/1990
EP 1 213 383 6/2002
EP 2 006 078 12/2008

Primary Examiner — Michael Tolin
(74) Attorney, Agent, or Firm — Cozen O'Connor (57) ABSTRACT Device for embedding a thread in a rubber profiled element comprising: a continuous thread feeder arranged on a structure, a moving support able to run along the structure between a raised and a lowered position. A hollow needle, comprising a canal in which the thread runs is fixed by one of its ends to the base of the moving support in the duct, and a tip at its other end capable of penetrating the rubber profiled element, a cutter arranged on the structure, comprising a rotary blade able to cut off the thread at a given distance from the tip of the needle upon each cycle of reciprocating movement of the needle. The cutter comprises a paddle arranged behind the cutting wire of the blade and intended to fold the tail around the tip of the needle just after the thread has been cut by the blade.

8 Claims, 5 Drawing Sheets (51) Int. Cl.
*B29D 30/38* (2006.01)
*B60C 11/14* (2006.01)
*B29D 30/46* (2006.01)
*B29D 30/06* (2006.01)
*B29D 30/66* (2006.01)
*B29L 30/00* (2006.01)

(52) U.S. Cl.
CPC .......... *B29D 30/0678* (2013.01); *B29D 30/66* (2013.01); *B29L 2030/002* (2013.01); *B29D 2030/463* (2013.01); *B29D 2030/662* (2013.01)

USPC ............... 156/72; 156/92; 156/250; 156/510; 156/538

(56) References Cited

U.S. PATENT DOCUMENTS

| | | |
|---|---|---|
| 5,642,679 A | 7/1997 | Monget et al. |
| 2002/0069503 A1* | 6/2002 | Sentmanat ............ 29/428 |

* cited by examiner

DEVICE AND METHOD FOR EMBEDDING THREADS IN A RUBBER PROFILED ELEMENT

RELATED APPLICATIONS

This is a U.S. National Phase Application under 35 USC 371 of International Application PCT/EP2010/062907, filed on Sep. 2, 2010.

This application claims the priority of French patent application no. 09/56009, filed Sep. 3, 2009, the entire content of which is hereby incorporated by reference.

FIELD OF THE INVENTION

The invention relates to the technical field of vehicle tyres and, in particular, to that of the manufacture of tyres comprising fibres injected in a given direction into one of the rubber components of which the said tyre is made.

BACKGROUND OF THE INVENTION

Publication EP 1 213 130 provides a specific idea of this type of tyre, in which short reinforcing fibres, or inserts, are embedded in the tread in an oriented fashion so as to improve the mechanical properties of this part of the tyre in a given direction.

Publication U.S. Pat. No. 7,005,022 proposes a method for producing this type of component comprising oriented fibres, which entails first of all extruding a profiled element made of a rubbery material comprising isotropically oriented short fibres and then in a second phase, using a puncturing means that is more or less comb shaped, piercing the profiled element in a given direction in order, through the effect of the needles entraining the fibres, to orient some of the fibres in the direction of piercing.

This first type of method allows part of the result to be achieved, but does not allow all of the fibres to be oriented in the desired direction.

Publication EP 1 213 383 proposes another means for implanting the said inserts in a rubber component of a tyre tread structure.

This device comprises a hollow needle capable of penetrating the rubber component, and through which the reinforcing fibre runs, a moving support capable of performing a reciprocating movement and supporting the said needle, a cutting blade for parting off the fibre that is to be implanted, and at least two clamping means for maintaining and regulating the position of the fibre.

This device has the advantage of allowing all the fibres or reinforcing inserts to be implanted in a precise and controlled direction.

It is, however, noted that the clamping means provided in this device have the object of pushing and holding the fibre in order, upon each cycle, to force the fibre to run along inside the needle.

This mode of operation has the effect of placing the fibre under compression.

Despite the presence of guide means, this compression is likely to cause the fibre to buckle in those parts of its path where it runs freely, particularly when the fibre is a textile fibre with little resistance to this type of loading.

Other methods and devices aimed at embedding threads in composite materials used chiefly in the aeronautical industry are also described in publications of the prior art.

Publication U.S. Pat. No. 5,186,776 describes a similar device in which the thread, like in the device described earlier, is pushed using a nonreturn system positioned at the exit of the means that distributes the thread into the duct of a needle coupled to an ultrasonic excitation means.

Publication U.S. Pat. No. 5,642,679 describes a device the purpose of which is to insert a continuous thread through a multitude of layers of composite material in order to join them together. This device does not anticipate causing the thread to run inside the needle and does not provide cutting means capable, as will be seen later on, of creating a starter tail each time the needle is embedded in the material.

SUMMARY OF THE INVENTION

It is an object of the invention to provide an original means of use of a device of the type that directly embeds a thread in a rubber component in a given direction.

The device for embedding a thread in a rubber profiled element in a given direction comprises:
  a continuous thread-feed means,
  a moving support able to run along a structure in a reciprocating rectilinear movement between a raised position and a lowered position and comprising a top and a base between which is formed a duct intended to guide the thread,
  a hollow needle comprising a canal in which the said thread is able to run, which needle is fixed by one of its ends to the base of the moving support in the continuation of the duct, and comprising at its other end a tip capable of penetrating the said rubber profiled element,
  a cutting means arranged on the structure, comprising a rotary blade comprising a cutting wire able, when the needle is in the raised position, to cut off the thread at a given distance (d) from the tip of the needle upon each cycle of reciprocating movement of the needle.

This device is characterized in that the cutting means comprises a paddle arranged behind the cutting wire of the blade and intended to strike the thread leaving the needle just after the thread has been cut by the blade.

The method of implementing the device according to an embodiment of the invention comprises the following steps:
  A—when the needle is in the raised position above the surface of the profiled element, a given length of thread is released on the tip side of the said needle to constitute a tail,
  B—the needle is lowered to make the tip of the said needle penetrate the profiled element over a given depth,
  C—the needle is extracted from the profiled element while allowing the thread to run along inside the needle,
  D—the tip of the needle is raised by a given height, above the surface of the profiled element, so as to release a length of thread between the tip of the needle and the surface of the profiled element which length is less than the depth to which the needle penetrated the profiled element,
  E—the thread is cut off level with the surface of the profiled element so as to release a new tail of given length shorter than the depth to which the needle penetrated the profiled element.

This method is characterized in that, just after cutting, the paddle imparts to the tail an impulse in a direction substantially perpendicular to the direction of the needle so as to fold the tail around the tip of the needle.

In that way, upon each cycle, the tail of thread formed by the thread situated outside of the needle on the tip side just after the thread has been cut is forced to fold around the edge of the needle outlet canal. The edge of the needle outlet canal acts somewhat like a wedge acting on the folded-over part of the thread and capable of carrying the said thread along.

This arrangement on the one hand prevents the thread from riding back up inside the needle canal and from sliding freely out of the needle during the downward travel of the needle towards the surface of the profiled element, which would have the effect of shortening the tail.

It also allows the tail, folded around the edge of the needle outlet canal, to remain attached to the tip of the needle as the needle is lowered into the thickness of the profiled element rather than being entrained by the friction forces generated by contact between the tail and the walls of the perforation made by the needle in the profiled element, which would have the effect of lengthening the tail.

As the needle is raised again, the wedge effect disappears and the tail is held in position in the perforation by the rubbery material that grips it, and prevents the thread present in the needle from riding back up, such that the raising movement allows the thread to be made to run along inside the needle. During this movement, the portion of thread comprised between the inlet of the needle and the tail is kept under tension. The thread is now pulled through the needle rather than pushed as was proposed in the device covered by publication EP 1 213 383.

To make it easier for the thread to run along inside the needle all that is required then is a feed means that delivers the thread at zero tension to the entrance to the needle in order to feed the device continuously without there being any need at any time in the embedding cycle for the thread to be placed under compression. The tension on the thread which is exerted during the phase of raising the needle has the sole objective of overcoming the forces of friction of the thread on the inside of the canal of the needle.

In addition, because of the operational simplicity of the device according to the invention, and because of the low number of mechanical components involved, it is possible substantially to increase the speed at which the inserts are embedded.

DETAILED DESCRIPTION OF THE INVENTION

Figure 1:
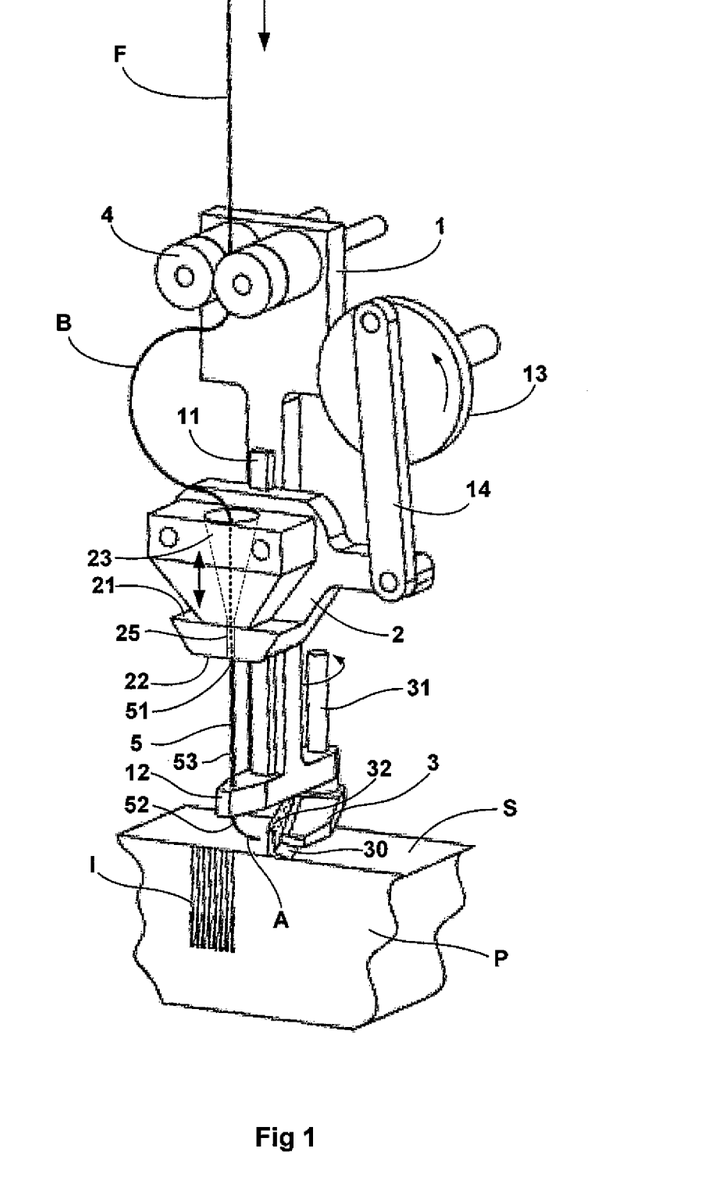
FIG. 1 depicts a perspective view of a device according to an embodiment of the invention.

The device illustrated in FIG. 1 comprises a structure 1 on which are mounted a thread F feed means 4, a moving support 2 supporting a hollow needle 5, and a cutting means 3.

The feed means 4 is placed at the top of the structure 1 and is able to deliver the thread F at a given and regulated constant speed.

The moving support 2 is connected to the structure via a straight guide rail 11. This moving support 2 is given a reciprocating movement between a raised position and a lowered position, by a link rod 14 and a crankshaft 13 turned by a motor (not depicted) secured to the structure 1.

What is meant by the raised position is the position of the structure that corresponds to the phase of the cycle during which the structure is in the position furthest from the surface S of the profiled element P, and the lowered position means the position corresponding to the phase of the cycle during which the structure is in the position closest to the surface S.

The moving support 2 comprises a base 22 and a top 21 between which is formed a duct 25 (depicted in dotted line) for guiding the thread F.

A hollow needle 5, comprising a canal 53 through which the thread F runs, is fixed by one of its ends 51 to the base of the moving support 2 in the continuation of the duct 25 made between the base 22 and the top 21 of the moving support 2. The tip of the needle, from whence the thread F emerges, is directed towards the surface S of the profiled element P. The needle effects the reciprocating movement as one with the support 2.

The diameter of the needle is chosen to improve the penetration of the needle in the rubber. For preference, the needle chosen will have the smallest outside diameter and will correspond to the diameter of the thread that is to be embedded, which can vary from 0.1 mm to 1 mm in the most commonplace applications. Quite obviously correct sliding of the thread inside the interior canal of the needle will be ensured. To do this, the difference in diameter between the thread and the inside diameter of the needle must not be smaller than 0.05 mm.

To improve the guidance of the needle in its up and down movement, a guide means 12 in which the needle runs freely is arranged at the base of the structure 2, as close as possible to the surface S of the profiled element P, so that the tip of the needle does not escape from the guide means when the moving support is in the raised position.

To improve the guidance of the thread F as it enters the duct 25 situated on the top 21 of the moving support 2, a thread guide means 23 is arranged on the top of the said support. This thread guide means 23 has the form of a frustoconical passage, the smallest diameter of which is positioned on the same side as the duct 25 made between the top and the base of the moving support, and the larger diameter of which is placed at the entrance of the thread F into the guide means. It goes without saying that the guide means is not tied to this particularly simple form of embodiment and can be adapted in numerous ways.

A cutting means 3 comprising a blade 30 comprising a cutting wire 34 is installed in the bottom part of the structure 1. This cutting means is in the form of a cutter rotated about an axis 31 substantially parallel to the direction of movement of the needle by a motor (not depicted) fixed to the structure 1. The cutting means is arranged in such a way that it can be adjusted translationally along the axis 31 so that it cuts off the thread F between the surface F of the profiled element and the tip of the needle 52 at a given and adjustable distance d from the said tip. The rotary cutter is positioned between the needle 5 guide means 12 and the surface S of the profiled element P.

The rotary movement of the cutter is adjusted in such a way that it effects one complete revolution for each back-and-forth cycle of the needle. This movement is set so that the thread F is cut off when the tip of the needle is in the raised position. To do that, it may be advantageous to use the same drive means to drive both the crankshaft 13 and the rotary cutter 3, by adapting the mechanical transmissions accordingly.

The blade 30 of the cutter is extended by a paddle 32 that runs substantially perpendicular to the plane of the blade. When considering the direction of travel of the blade, the paddle 32 is positioned behind the cutting wire, so as to impact the tail immediately after the thread has been cut. This impulse has the effect of forcing the free end of the thread that forms the starter tail to fold around the tip 52 as has been illustrated in FIGS. 2 and 3.

Figure 5:
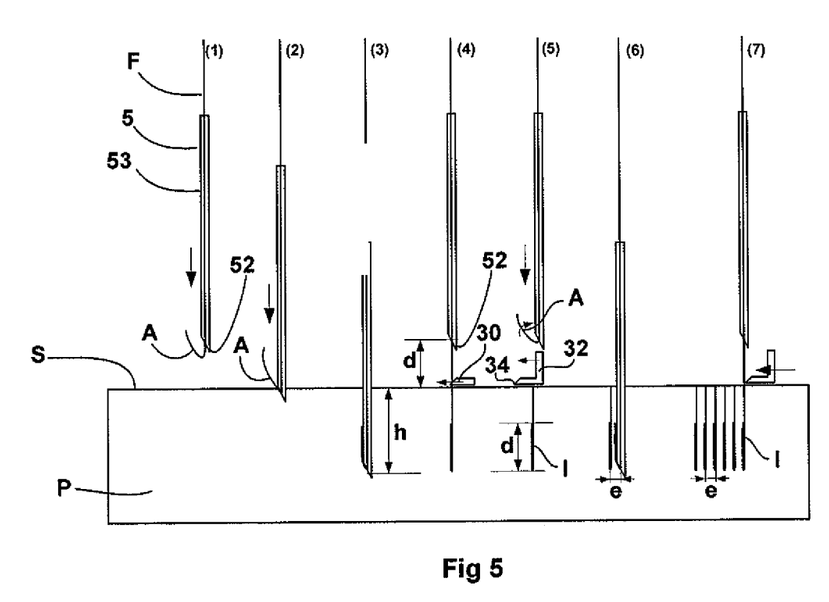
FIG. 5 depicts the various phases of the cycle of embedding an insert according to a first mode of use of the device.

The key positions of the operating cycle of the device according to the invention are detailed in FIG. 5 and are identified by numerals (1) to (6) placed between parentheses. Each cycle corresponds to the embedding of one insert I in the profiled element P.

The first position (1) corresponds to the raised position of the needle 5 as it starts its movement towards the lowered position just after cutting. It may be seen that the free end of the thread F extends beyond the tip of the needle 52 to form a tail A folded around the edge of the needle thread outlet canal 52.

The length of the tail A has to be chosen with care. Indeed, it has not to be too long so that as the needle penetrates the profiled element, the forces of friction between the tail and the rubbery product of the profiled element do not exceed the strength of the wedge effect described hereinabove, but it has not to be too short either, so that as the needle is raised again, the tail remains in position in the bottom of the perforation. In practice, for the textile threads usually employed in the tyre industry, it will be considered that the length of the tail may usefully be comprised between 10 times and 20 times the diameter, or as a general rule, a length of between 3 mm and 5 mm which covers most applications in this field. Likewise, the greater the diameter of the thread, the more the length of the tail can be shortened. In any event, steps will be taken to ensure that the length of the tail is less than the depth of penetration (h).

The second position (2) corresponds to the downwards movement of the needle 5 and to the moment at which the tip of the needle pierces the surface S of the rubber profiled element P. This position is also illustrated in the perspective view of FIG. 6.

Figure 6:
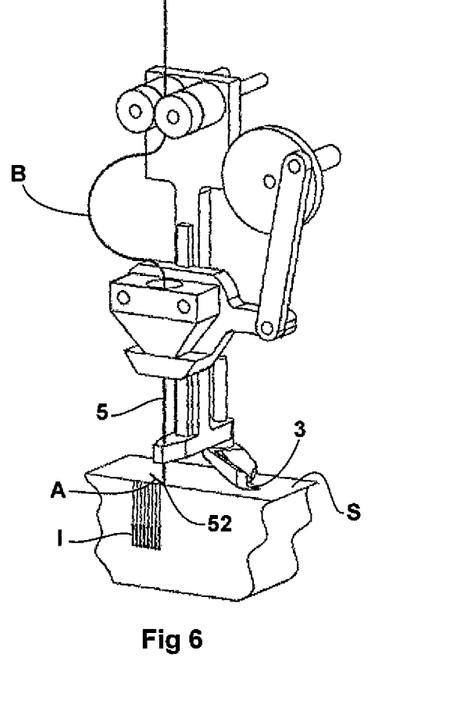
FIGS. 6 and 7 depict perspective views of the positions of the parts of the device at specific phases of the embedding cycle.

It will be noted that at this precise moment, the tail A is folded back along the needle 5. In this configuration, the thread is blocked by the edge of the outlet canal and this deprives the thread of any movement in the opposite direction to the direction of travel of the needle. The edge of the needle outlet canal performs its wedging function and prevents the tail from entraining the thread.

Figure 7:
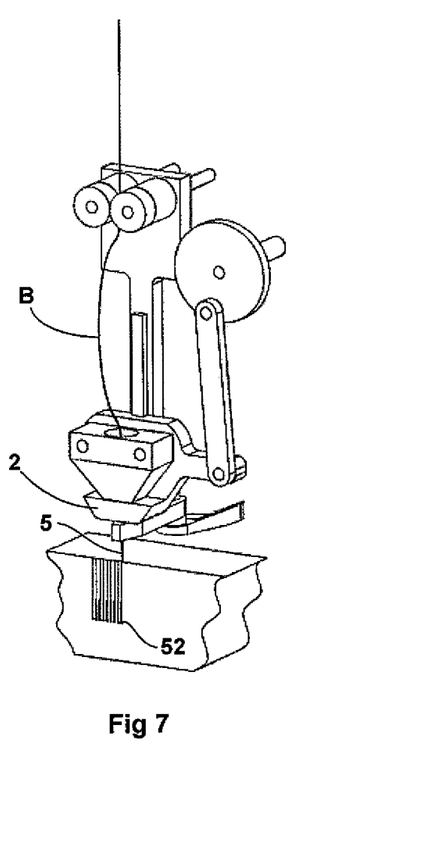

The third position (3) corresponds to the lowered position of the needle, in which position the tip of the needle penetrates the profiled element to a given depth h, and corresponds to the perspective view of FIG. 7.

The needle then begins a movement of being raised back up from its lowered position to its raised position illustrated in position (4). The raised position is reached when the tip of the needle is distant from the surface S of the profiled element P by a given and adjustable length d.

During this raising movement, the free part of the thread and of the tail A are gripped by the rubbery material of the profiled element. The friction forces applied to the tail and, gradually, to the remainder of the thread released by the needle allow the thread F to be tensioned, and the needle rises up along the thread which remains fixed with respect to the surface S of the profiled element P.

When the raised position is reached, the blade 5 cuts off the thread and releases a tail A which is available for embedding the next insert I, as illustrated by position (4).

It will be noted that it is advantageous for the thread to be cut off as close as possible to the surface S. To do this all that is required is for the embedding device according to the invention to be arranged with the blade 3 positioned as close as possible to the surface S.

This scenario corresponds to the scenario most frequently encountered in the field of tyres and usefully allows the thread to be cut relatively cleanly because the surface acts somewhat like an anvil capable of holding the thread while it is being cut.

When it proves necessary to allow the thread to protrude beyond the surface it may prove beneficial to have the cutting blade collaborate with a mating blade in order to avoid excessive return forces on the thread.

The length d, which determines the length of the tail A, is adjusted by placing the support 2 in a raised position and by adapting the axial position of the blade along its axis 31. The depth P is adjusted by altering the amplitude of the movement of the support 2 by altering the diameter of the crankshaft 13. The amplitude of the movement corresponds to the depth h increased by the length d.

Immediately after cutting, as has been illustrated by position (5), the paddle 32 strikes the thread and imparts an impulse to the tail A in a direction substantially perpendicular to the direction in which the needle moves.

Figure 2:
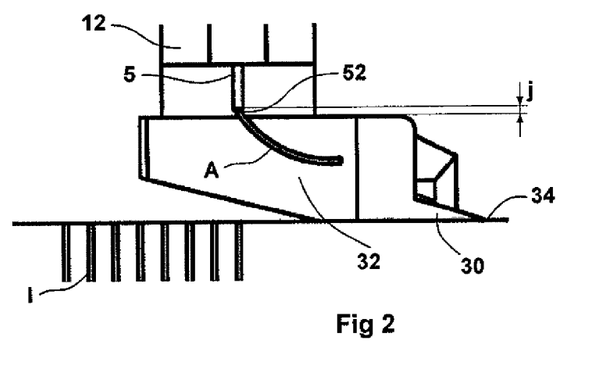
FIGS. 2, 3 and 4 depict operational details of the cutter in the creation of the starter tail.
Figure 3:
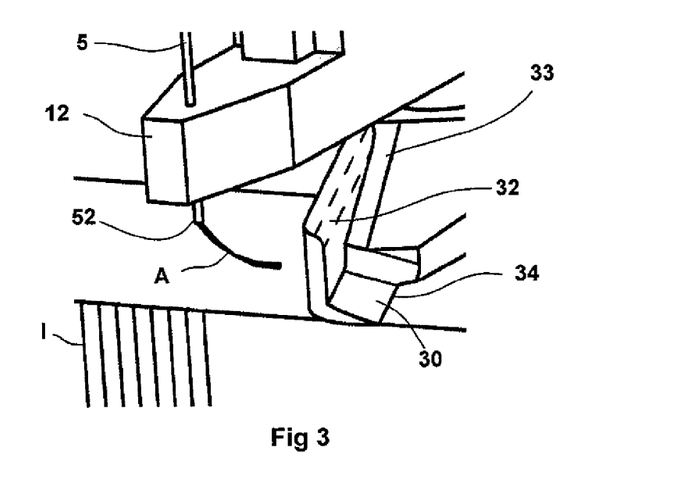

In order for the folding-over of the tail to be as pronounced as possible, steps are taken to ensure that the clearance j between the end of the needle 32 in the raised position and the paddle 32 is as small as possible, and at least equal to the diameter of the thread, as has been illustrated in FIG. 2. The clearance j can usefully range between one and five times the diameter of the thread.

It may also prove practical to be able to adjust the clearance j when the length of the tail varies. To do this, sets of removable paddles may therefore be provided, their heights varying according to the desired length of tail and which are fixed to the support 33 of the blade carrying the paddle 32.

Figure 4:
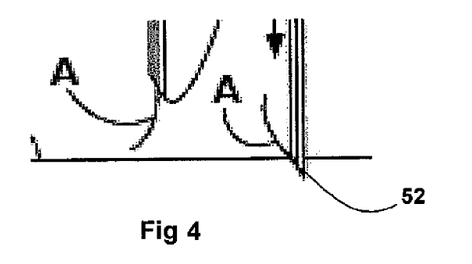

This movement of folding the tail around the tip 52, as is illustrated in FIG. 4, is enough to block the movement whereby the thread rides back up inside the needle as the needle moves between the raised position illustrated at (5) and the position in which the tip penetrates the surface of the profiled element, illustrated at (2).

In order to avoid the thread riding back up, steps are also taken to ensure that the tension in the thread as it enters the needle duct 25 is zero, by controlling the feed means 4 in such a way that that portion of thread that lies between the feed means 4 arranged on the structure 1, and the entry 51 to the duct 25 or to the guide means 23, forms a loop B, irrespective of the position of the moving support 2, as has been illustrated in FIG. 1, and in FIGS. 6 and 7.

Figure 8:
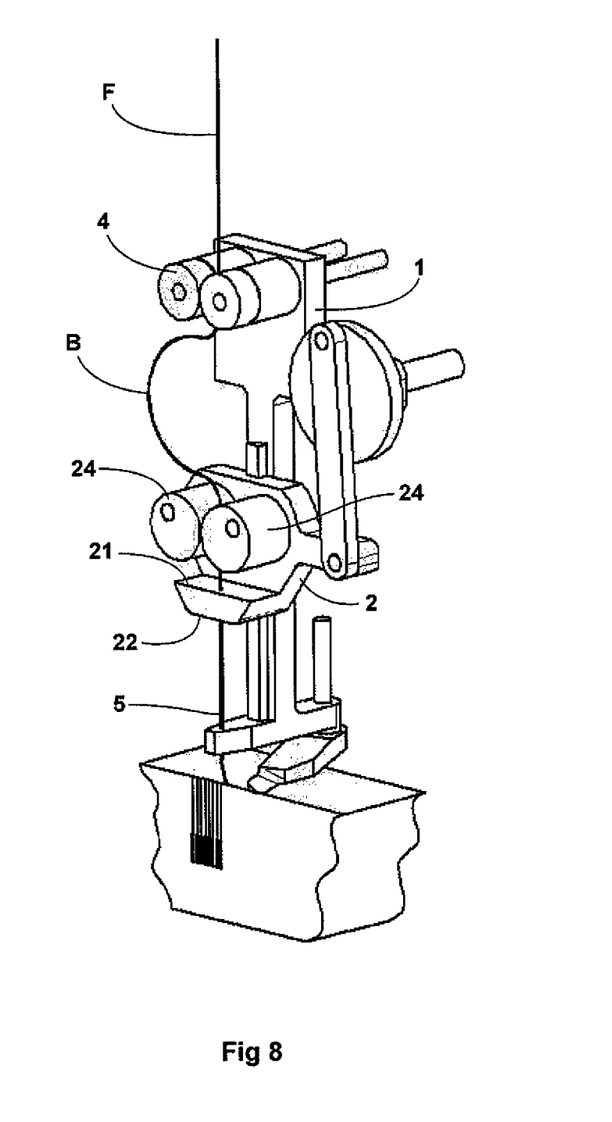
FIG. 8 depicts a perspective view of an alternative form of embodiment of the device according to the invention.

FIG. 8 illustrates the case of a device in which the guide means is in the form of two rollers 24 between which the thread can run. These rollers may be completely free to rotate in both directions or may be prevented from rotating in one of the two directions so as to prevent the thread from riding back up if the part of the thread comprised between the rollers 24 and the feed means 3 is inadvertently tensioned.

The next insert I is embedded by moving the profiled element by a step length e relative to the structure 1, as is illustrated by the position (6), and then by repeating the cycle that has just been described.

By repeating these operations as many times as necessary, a rubber profiled element is obtained in which inserts I are embedded evenly, as has been depicted in position (7).

The insert of length h comprises at its base a turn-back of length d corresponding to the tail A. The presence of a double length of thread at the base of the insert has the advantage of preferably reinforcing the base of the tread block elements when the surface S corresponds to that surface of a tyre tread that is in contact with the ground.

The cycle described in the present description illustrates the case in which the inserts are embedded perpendicular to the surface S of the profiled element P. It is quite obviously possible to modify the angle of embedding by inclining the structure so that the rail 11 on which the moving support 2 runs makes a given angle with the surface S.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A device for embedding a thread in a rubber profiled element in a given direction comprising:
   a continuous thread-feed means arranged on a fixed structure;
   a moving support able to run along a structure in a reciprocating rectilinear movement between a raised position and a lowered position and comprising a top and a base between which is formed a duct intended to guide the thread;
   a hollow needle comprising a canal in which the said thread is able to run, which needle is fixed by one of its ends to the base of the moving support in the continuation of the duct, and comprising at its other end a tip capable of penetrating the said rubber profiled element; and
   a cutting means arranged on the structure, comprising a rotary blade comprising a cutting portion able, when the needle is in the raised position, to cut off the thread at a given distance from the tip of the needle upon each cycle of reciprocating movement of the needle and to produce a tail of thread extending from the tip of the needle,
   wherein the cutting means comprises a paddle arranged behind the cutting portion of the blade and intended to fold the tail around the tip of the needle just after the thread has been cut by the blade.

2. The device according to claim 1, wherein the cutting means is a cutter that rotates about an axis parallel to the direction of movement of the needle.

3. The device according to claim 1, wherein the feed means is connected to a regulating means configured to keep the portion of thread situated between the said feed means and the entrance to the duct of the moving support at zero tension irrespective of the position of the moving support.

4. A method for embedding an insert formed of a length of thread in a rubber profiled element via one of the surfaces thereof, using a device according to claim 1, comprising:

A—releasing a given length of thread on the tip side to constitute a tail when the needle is in the raised position above the surface of the profiled element, B—lowering the tip of the needle to make the tip of the needle penetrate the profiled element over a given depth, C—extracting the needle from the profiled element while allowing the thread to run along inside the needle, D—raising the tip of the needle by a given height, above the surface of the profiled element, so as to release a length of thread between the tip of the needle and the surface of the profiled element which length is less than the depth to which the needle penetrated the profiled element, and E—cutting off the thread level with the surface of the profiled element using a cutting means the rotary blade of which comprises a paddle positioned to the rear of the cutting portion of the said blade, so as to release a new tail of given length, wherein, just after cutting, the said paddle imparts to the tail an impulse in a direction substantially perpendicular to the direction of travel of the needle so as to fold the tail around the tip of the needle.

5. The method according to claim 4, wherein, on completion of step F, the method further comprising moving the profiled element by a given step length with respect to the structure so that a new insert can be embedded.

6. The method according to claim 4, wherein, during step E, the thread is cut off substantially level with the surface of the profiled element.

7. The method according to claim 4, wherein the distance between the top of the paddle and the tip of the needle, when the needle is in the raised position, is adjusted so that this distance is between one and five times the diameter of the thread.

8. The method according to claim 4, wherein the feed means is regulated in such a way that the portion of thread between the feed means and the entry to the duct of the needle forms a loop B irrespective of the position of the moving support.

* * * * *